D. FERRELL.
THERMO CUT-OUT.
APPLICATION FILED JULY 29, 1915.
Patented Aug. 1, 1916.
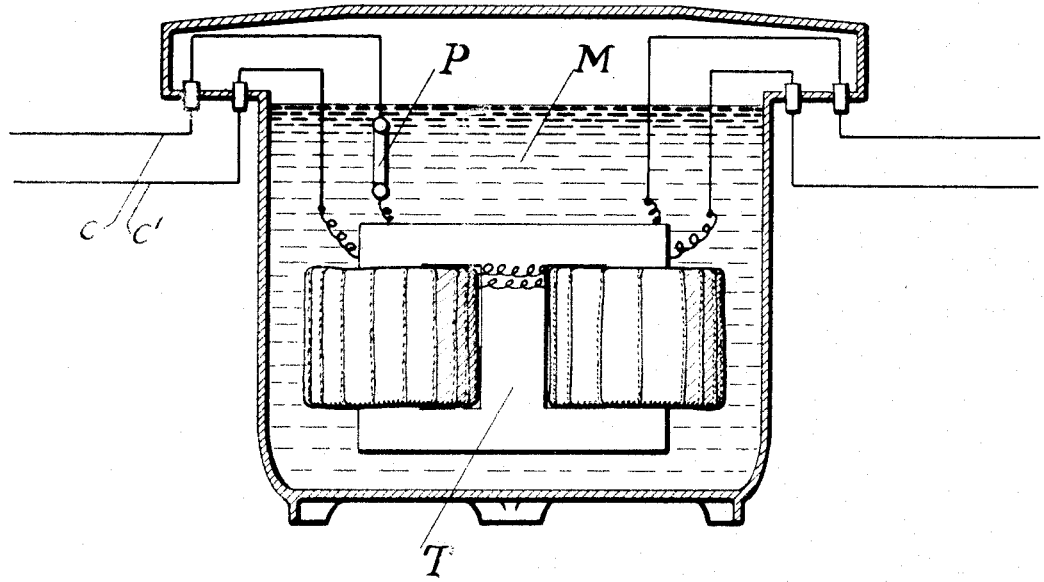
Inventor
Dent Ferrell
By Watson E. Coleman
Attorney

UNITED STATES PATENT OFFICE.

DENT FERRELL, OF CARTERVILLE, ILLINOIS.

THERMO CUT-OUT.

1,192,879.  Specification of Letters Patent.  Patented Aug. 1, 1916.

Application filed July 29, 1915. Serial No. 42,630.

*To all whom it may concern:*

Be it known that I, DENT FERRELL, a citizen of the United States, residing at Carterville, in the county of Williamson and State of Illinois, have invented certain new and useful Improvements in Thermo Cut-Outs, of which the following is a specification, reference being had to the accompanying drawings.

This invention relates to certain improvements in thermo cut-outs, and it is an object of the invention to provide a novel and improved device of this general character wherein an electrical apparatus, particularly a transformer, is protected from heat damage due to continued performance at excess of their intended capacity and whereby the circuit will be interrupted on overload.

Since the over capacity and performance of transformers or similar types of electrical apparatus depend on the temperature of the cooling medium, the present invention has the advantage that when the cooling medium reaches a harmful temperature the apparatus will be disconnected from the electrical supply and saved from heat damage.

It is also an object of the invention to provide a device of this general character adapted to be submerged within the cooling medium of an electrical apparatus and which is used in connection with an electrical apparatus.

The invention consists in the details of construction and in the combination and arrangement of the several parts of my improved thermo cut-out whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein is disclosed a diagrammatic view illustrating an embodiment of my invention.

As disclosed in the accompanying drawings, T represents an electrical device, such as a transformer, submerged within the cooling fluid or medium M contained within the inclosed chamber A, and $c$, $c'$ denote electrical conductors leading from a source of electrical energy and in communication with the device T and passing through the cooling medium M and a portion P of a conductor $c$ submerged within the medium M is composed of such a composition as will be melted or fused by the cooling medium of the apparatus when the same reaches a harmful temperature, thereby causing an interruption or cessation of the electrical circuit and directly or indirectly of the currents producing the harmful temperature of said apparatus and saving the latter from damages due to such harmful temperature.

In practice, I find it preferable to have the portion P formed from an alloy composed of bismuth, lead and tin.

From the foregoing description, it is thought to be obvious that a thermo cut-out constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with an inclosed chamber containing a cooling fluid, an electrical apparatus submerged within said cooling fluid, and a supplying circuit in communication with the apparatus and disposed through the cooling fluid, a portion of said circuit submerged within the cooling fluid being fusible.

In testimony whereof I hereunto affix my signature in the presence of two witnesses.

DENT FERRELL.

Witnesses:
WILLIAM H. WARDER,
HOSEA V. FARRELL.